United States Patent [19]

Baker, Jr. et al.

[11] Patent Number: 5,468,368
[45] Date of Patent: * Nov. 21, 1995

[54] LUBRICANT HYDROCRACKING PROCESS

[75] Inventors: Charles L. Baker, Jr., Thornton, Pa.; Cynthia T. Chu, Morrestown, N.J.; Dominick N. Mazzone, Wenonah, N.J.; Nancy M. Page, Sewell, N.J.

[73] Assignee: Mobil Oil Corporation, Fairfax, Va.

[*] Notice: The portion of the term of this patent subsequent to Feb. 28, 2009, has been disclaimed.

[21] Appl. No.: 78,338

[22] Filed: Jun. 21, 1993

[51] Int. Cl.$^6$ .......... C10G 45/10; C10G 65/08; C10G 69/10
[52] U.S. Cl. .......... 208/58; 208/28; 208/61; 208/111
[58] Field of Search .......... 208/46, 58, 59, 208/61, 111, 18, 27, 87, 89, 28; 423/704, 705, 706; 502/60, 74, 64; 585/520, 530, 643, 648

[56] References Cited

U.S. PATENT DOCUMENTS

| | | | |
|---|---|---|---|
| 3,923,640 | 12/1975 | Wight | 208/111 |
| 4,283,271 | 8/1981 | Garwood et al. | 208/59 |
| 4,292,166 | 9/1981 | Gorring et al. | 208/59 |
| 4,676,887 | 6/1987 | Fischer et al. | 208/61 |
| 4,828,677 | 5/1989 | Fischer et al. | 208/89 |
| 4,851,109 | 7/1989 | Chen et al. | 208/58 |
| 4,853,104 | 8/1989 | Degnan et al. | 208/61 |
| 4,919,789 | 4/1990 | Fischer et al. | 208/61 |
| 5,057,296 | 10/1991 | Beck | 423/277 |
| 5,102,643 | 4/1992 | Kresge et al. | 423/328 |
| 5,128,024 | 7/1992 | LaPierre et al. | 208/89 |
| 5,174,888 | 12/1992 | Kresge et al. | 208/46 |
| 5,183,561 | 2/1993 | Kresge et aL. | 208/251 R |

OTHER PUBLICATIONS

Ser. No. 07/734,826 filed on Jul. 24, 1991, now U.S. Pat. No. 5,288,395.
Ser. No. 07/734,850 filed on Jul. 24, 1991 now U.S. Pat. No. 5,281,328.

*Primary Examiner*—Asok Pal
*Assistant Examiner*—Bekir L. Yildirim
*Attorney, Agent, or Firm*—Alexander J. McKillop; Malcolm D. Keen; Jessica M. Sinnott

[57] ABSTRACT

A bottoms fraction of fuels hydrocracking which boils above about 600° F. and contains at least 10 wt. % aromatics is converted to a reduced aromatics lube/base stock product over a catalyst comprising a crystalline material which exhibits unusually large sorption capacity demonstrated by its benzene adsorption capacity of greater than about 15 grams benzene/100 grams anhydrous crystal at 50 torr and 25° C. and a-hydrogenation-dehydrogenation functionality, preferably palladium, under high pressure conditions sufficient to reduce the aromatics content to about 10 wt. %. The bottoms fraction is dewaxed prior to high pressure hydroprocessing over a catalyst comprising HZSM-5 to reduce the pour point of the fraction to about 20° F. Typically, the bottoms fraction is produced in a moderate pressure fuels hydrocracking process over a bifunctional amorphous catalyst.

26 Claims, 1 Drawing Sheet

5,468,368

LUBRICANT HYDROCRACKING PROCESS

FIELD OF THE INVENTION

This invention relates to the refining of petroleum hydrocarbons and more particularly to a hydroprocessing method in which a high boiling petroleum feedstock of a fuels hydrocracking process is hydrotreated over an ultra large pore crystalline material to produce a lube oil.

BACKGROUND OF THE INVENTION

Mineral oil based lubricants are conventionally produced by a separative sequence carried out in the petroleum refinery which comprises fractionation of a paraffinic crude oil under atmospheric pressure followed by fractionation under vacuum to produce distillate fractions (neutral oils) and a residual fraction which, after deasphalting and solvent treatment may also be used as a lubricant basestock usually referred to as bright stock.

Neutral oils, after solvent extraction to remove low viscosity index (V.I.) components are conventionally subjected to dewaxing, either by solvent or catalytic dewaxing processes, to the desired pour point, after which the dewaxed lubestock may be hydrofinished to improve stability and remove color bodies. This conventional technique relies upon the selection and use of crude stocks, usually of a paraffinic character, to produce the desired lube fractions of the desired qualities in adequate amounts.

The range of permissible crude sources may, however, be extended by the lube hydrocracking process which is capable of utilizing crude stocks of marginal or poor quality, usually with a higher aromatic content than the best paraffinic crudes. The lube hydrocracking process, which is well established in the petroleum refining industry, generally comprises an initial hydrocracking step carried out under high pressure in the presence of an amorphous bifunctional catalyst which effects partial saturation and ring opening of the aromatic components which are present in the feed.

The hydrocracked product is then subjected to dewaxing in order to reach the target pour point since the products from the initial hydrocracking step which are paraffinic in character include components with a relatively high pour point which need to be removed in the dewaxing step.

In theory, as well as in practise, lubricants should be highly paraffinic in nature since paraffins possess the desirable combination of low volatility and high viscosity index.

Conventional hydrocracking catalysts combine an acidic function and a hydrogenation function and are considered bifunctional. The acidic function in the catalyst is provided by a porous solid carrier such as alumina or silica-alumina. Amorphous materials have significant advantages for processing very high boiling feeds which contain significant quantities of bulky polycyclic materials (aromatics as well as polynaphthenes) since the amorphous materials usually possesses pores extending over a wide range of sizes and the larger pores, frequently in the size range of 100 to 400 Angstroms (Å) are large enough to provide entry of the bulky components of the feed into the interior structure of the material where the acid-catalyzed reactions may take place.

Crystalline materials, especially the large pore size zeolites such as zeolites X and Y, have been found to be useful for a number of hydrocracking applications since they have the advantage, as compared to the amorphous materials, of possessing a greater degree of activity, which enables the hydrocracking to be carried out at lower temperatures at which the accompanying hydrogenation reactions are thermodynamically favored. In addition, the crystalline catalysts tend to be more stable in operation than the amorphous materials such as alumina. The crystalline materials may, however, not be suitable for all applications since even the largest pore sizes in these materials, typically about 7.4 Å in the X and Y zeolites, are too small to permit access by various bulky species in the feed. For this reason, hydrocracking of residual fractions and high boiling feeds has generally required an amorphous catalyst of rather lower activity.

The bifunctional catalyst also comprises a metal component which provides the hydrogenation/dehydrogenation functionality. The metal component typically comprises a combination of metals from Groups IVA, VIA and VIIIA of the Periodic Table (IUPAC Table) although single metals may also be encountered. Combinations of metals from Groups VIA and VIIIA are especially preferred, such as nickel-molybdenum, cobalt-molybdenum, nickel-tungsten, cobalt-nickel-molybdenum and nickel-tungsten-titanium. Noble metals of Group VIIIA especially platinum or palladium may be encountered but are not typically used for treating high boiling feeds which tend to contain significant quantities of heteroatoms which function as poisons for these metals.

In U.S. Pat. No. 5,128,024 zeolite beta is described as a hydrocracking catalyst for heavy hydrocarbon oils. It can be contrasted with the conventional hydrocracking catalysts because it demonstrates ability to attack paraffins in the feed in preference to the aromatics. This reduces the paraffin content of an unconverted hydrocracker effluent fraction thereby lowering the pour point of the product.

However, the aromatics as well as other polycyclic materials are less readily attacked by zeolite beta than the paraffinic materials with the result that they pass through the process and remain in the product, consequently reducing the product V.I. While zeolite beta-catalyzed processes have shown effectiveness for dealing with highly paraffinic feeds, the high isomerization selectivity of the zeolite beta catalysts, coupled with a lesser capability to remove low quality aromatic components, tended to limit the application of the process to feeds which contained relatively low quantities of aromatics.

In contrast to zeolite beta, amorphous catalysts used in lube hydrocracking are relatively non-selective for paraffin isomerization in the presence of polycyclic components but have a high activity for cracking resulting in a low overall yield and high dewaxing demands. While, as mentioned above, the zeolite beta-catalyzed processes are capable of achieving higher yields, since the zeolite has a much higher selectivity for paraffin isomerization, the aromatics are not always effectively dealt with in lower quality feeds.

In addition to the lube hydrocracking processes described above, hydrocracking has been employed in the production of fuels such as gasoline and middle distillates.

Fuels hydrocracking is a process which has achieved widespread use in petroleum refining for converting various petroleum fractions to lighter and more valuable products, especially distillates such as jet fuels, diesel oils and heating oils. Hydrocracking is generally carried out in conjunction with an initial hydrotreating step in which the heteroatom-containing impurities in the feed are hydrogenated without a significant degree of bulk conversion. During this initial step, the heteroatoms, principally nitrogen and sulfur, are converted to inorganic form (ammonia, hydrogen-sulfide)

and these gases may be removed prior to the subsequent hydrocracking step although the two stages may be combined in cascade without interstage separation as, for example, in the Unicracking-JHC process and in the moderate pressure hydrocracking process described in U.S. Pat. No. 4,435,275.

In the second stage of the operation, the hydrotreated feedstock is contacted with a bifunctional catalyst which possesses both acidic and hydrogenation/dehydrogenation functionality. In this step, the characteristic hydrocracking reactions occur in the presence of the catalyst. Polycyclic aromatics in the feed are hydrogenated, and ring opening of aromatic and naphthenic rings takes place together with dealkylation. Further hydrogenation may take place upon opening of the aromatic rings. Depending upon the severity of the reaction conditions, the polycyclic aromatics in the feed will be hydrocracked to paraffinic materials or, under less severe conditions, to monocyclic aromatics as well as paraffins. Naphthenic and aromatic rings may be present in the product, for example, as substituted naphthenes and substituted polycyclic aromatics in the higher boiling products, i.e. the hydrocracker bottoms, depending upon the degree of operational severity.

Under the conditions of fuels hydrocracking, the crystalline hydrocracking catalysts generally tend to produce significant quantities of gasoline boiling range materials (approximately 330° F.–, 165° C.–) as product. Since hydrocracked gasolines tend to be of relatively low octane and require further treatment as by reforming before the product can be blended into the refinery gasoline pool, hydrocracking is usually not an attractive route for the production of gasoline. On the other hand, it is favorable to the production of distillate fractions, especially jet fuels, heating oils and diesel fuels since the hydrocracking process reduces the heteroatom impurities characteristically present in these fractions to the low level desirable for these products.

The selectivity of crystalline aluminosilicate catalysts for distillate production may be improved by the use of highly siliceous zeolites, for example, the zeolites possessing a silica:alumina ratio of 50:1 or more as described in U.S. Pat. No. 4,820,402 (Partridge et. al.).

In conventional hydrocracking processes for producing middle distillates, especially jet fuels, from aromatic refinery streams such as catalytic cracking cycle oils, it has generally been necessary to saturate the aromatics present in the feed to promote cracking and to ensure that a predominantly paraffinic/naphthenic product is obtained. The hydrocracked bottoms fraction is usually recycled to extinction or blended with the distillate product even though it is highly paraffinic, because of the aromatic-selective character of the catalyst, and could form the basis for a paraffinic lube stock of higher value than the distillate produced by cracking it.

U.S. Pat. No. 4,851,109 describes integration of jet fuel and middle distillate production by moderate pressure hydrocracking and catalytic lube production using isomerization dewaxing over a catalyst based on zeolite beta. This process minimizes hydrogen consumption while producing naphthas and middle distillates of high quality. The bottoms fraction from moderate pressure fuels hydrocracking is processed in a hydroisomerization/hydrocracking step to produce a distillate fraction or an aromatics-rich fraction which may be used to produce a premium grade lube base stock using conventional processing technology. Even though an improvement in lube production is offered by the use of zeolite beta in a second stage hydroisomerization/ hydrocracking step, the aromatics, and especially the polycyclic aromatics, still pose a challenge.

SUMMARY OF THE INVENTION

The present process enables the refiner to manufacture a low aromatics lube basestock from the aromatic and paraffinic bottoms fraction of fuels hydrocracking.

The invention is directed to a process for producing a lubricant from a hydrocracked distillate boiling range product containing at least 10 wt. % aromatics comprising hydrotreating the feed over a catalyst comprising a synthetic ultra-large pore crystalline material in the presence of hydrogen and conditions sufficient to convert said hydrocracked distillate boiling range product to a lubricant of reduced aromatics content.

The present processing scheme can also be considered an effective integration of middle distillate production by fuels hydrocracking and catalytic lube production by lube hydrocracking which maximizes the production of both types of product and exploits most effectively the characteristics of both processes by using a lube hydrotreating catalyst based on a synthetic ultra-large pore crystalline material.

An important advantage of the invention is saturation of the aromatics contained in the hydrocracked product which preserves the viscosity and maintains the yield of the product.

The feed for the lube hydroprocessing is made by subjecting a hydrocarbon fraction to mild hydrocracking (under moderate pressure conditions) over a fuels hydrocracking catalyst. In this step, the low quality aromatic components of the feed are subjected to hydrocracking reactions which result in complete or partial saturation of aromatic rings accompanied by ring opening reactions to form products which are relatively more paraffinic; the limited conversion in the first stage, however, enables these products to be retained without undergoing further cracking to products boiling below the lube boiling range, typically below about 650° F. (about 345° C.). The catalyst used in this step is typically an amorphous moderate pressure fuels hydrocracking catalyst, but it may also be based on the mesoporous crystalline materials described below for the lube hydroprocessing. Typically, the conversion in this stage is limited to no more than 80%, preferably no more than 45% to 60% by weight of the original feed.

The highest boiling aromatics effluent from the fuels hydrocracking stage is subjected to high pressure hydrotreating over a lube hydrotreating catalyst based on a mesoporous siliceous material.

The hydrotreating catalyst comprising a crystalline material which has an inorganic non-pillared phase indicating a maximum perpendicular cross-section pore dimension of at least about 13 Angstroms. This crystalline Composition exhibits an X-ray diffraction pattern and a benzene adsorption capacity of greater than about 15 grams benzene/100 grams anhydrous crystal at 50 torr and 25° C. This crystalline material is defined in U.S. Pat. No. 5,102,643.

The lube hydrocracking process is typically operated with relatively high pressures in order to maximize conversion of aromatic components in the feed and for this purpose pressures of at least 800 psig (about 5620 kPa), usually from about 1000 to 3,000 psig (about 7000 to 20785 kPa abs.) are suitable. In a preferred embodiment, the lube hydroprocessing stage may be operated by passing the effluent of fuels hydrocracking through an interstage separator to remove products boiling below the lube boiling range, i.e. 650° F.–. The higher boiling bottoms fraction is then subjected to dewaxing to lower the pour point and then subjected to high pressure hydroprocessing over an ultra large pore crystalline material.

DRAWINGS

FIG. 1 illustrates a simplified schematic representation of the moderate pressure hydrocracking—high pressure hydroprocessing scheme used to make gasoline, distillate and low aromatics lube basestock.

DETAILED DESCRIPTION

Figure 1:
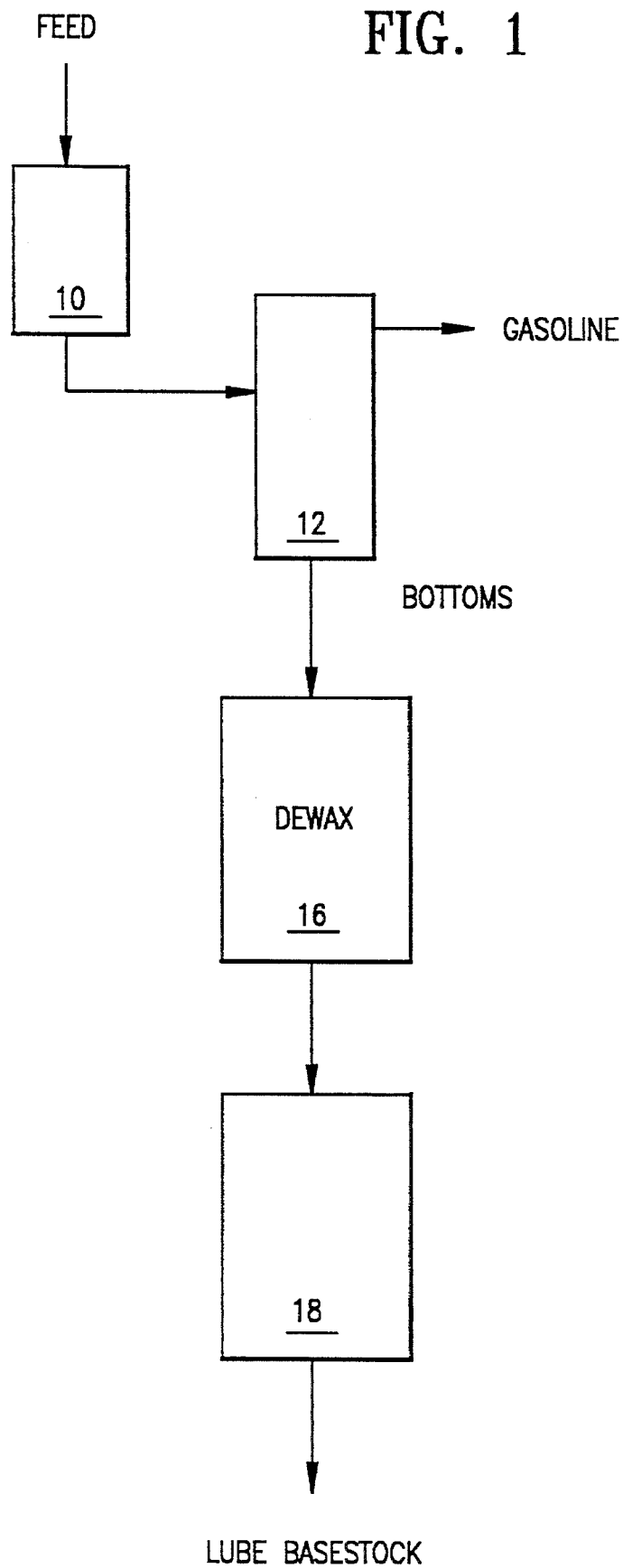

The bottoms fraction of the moderate pressure fuels hydrocracker effluent is subjected to high pressure lube hydrotreating over a mesoporous catalyst. Solvent or catalytic dewaxing will typically be necessary to reduce pour point to the desirable range either before or after the hydrotreating. The lube hydrotreating is carried out under high pressure conditions, typically at hydrogen pressures of at least about 800 psig (about 5620 kPa abs.) and usually in the range of about 1,000 to 3,000 psig (about 7000 to 20785 kPa abs.)

FEEDSTOCK

The feedstock for the moderate pressure fuels hydrocracking process is usually a heavy oil fraction having an initial boiling point of 200° C. (about 400° F.) and normally of 345° C. (about 650° F.) or higher, although lighter fractions such as naphtha or Udex raffinates or extracts and light cycle oil may be employed. Suitable high boiling feedstocks include gas oils such as vacuum gas oil, lube extracts produced by the solvent extraction of lube oil fractions using solvents such as phenol, furfural or N-methyl-pyrrolidone, visbreaker oil or deasphalted oil. Normally, the feedstock will have an extended boiling range, e.g. 345° C. to 590° C. (about 650° F. to 1100° F.) but may be of more limited ranges with certain feedstocks or alternatively may include or comprise non-distillable i.e. residual, fractions. The heteroatom is not critical: the nitrogen content will generally be in the range 200 to 1500 ppmw. Likewise, the sulfur content is not critical and typically may range as high as 5 percent by weight. Sulfur contents of 2.0 to 3.0 percent by weight are common. The heavy hydrocarbon oil feedstock will normally contain a substantial amount boiling above 230° C. (450° F.) and will normally have an initial boiling point of at least about 290° C. (about 550° F.), more usually about 345° C. (about 650° F.). Typical boiling ranges will be about 345° to 565° C. (about 650° to 1050° F.) or about 345° to 510° C. (650° to 950° F.) but oils with a narrower boiling range may, of course, be processed, for example, those with a boiling range of about 345° to 455° C. (about 650° to 850° F.). Heavy gas oils are often of this kind as are heavy cycle oils and other non-residual materials. It is possible to co-process materials boiling below 260° C. (about 500° F.) but the degree of conversion will be lower for such components. Feedstocks containing lighter ends of this kind will normally have an initial boiling point above 150° C. (about 300° F.).

The heavy oil feeds will comprise high molecular weight long chain paraffins and high molecular weight aromatics with a large proportion of fused ring aromatics. During the processing, the fused ring aromatics are hydrogenated by the metal function on the catalyst, naphthenes are cracked by the acidic catalyst and the paraffinic cracking products, together with paraffinic components of the initial feedstock undergo isomerization to iso-paraffins with some cracking to lower molecular weight materials. Hydrogenation of unsaturated side chains on the monocyclic cracking residues of the original polycyclics is catalyzed by the metal component of the hydrocracking catalyst to form substituted monocyclic aromatics which are highly desirable end products.

MODERATE PRESSURE FUELS HYDROCRACKING STAGE

General

The feedstock is heated to an elevated temperature and is then subjected to moderate pressure fuels hydrocracking. Typically, in fuels hydrocracking, the feed is passed over the hydrotreating and hydrocracking catalysts in the presence of hydrogen. Because the thermodynamics of hydrocracking become unfavorable at temperatures above about 450° C. (about 850° F.) temperatures above this value will not normally be used. In addition, because the hydrotreating and hydrocracking reactions are exothermic, the feedstock need not be heated to the temperature desired in the catalyst bed which is normally in the range 290°, usually 360° C. to 440° C. (about 550° F., usually 675° F. to 825° F.). At the beginning of the process cycle, the temperature employed will be at the lower end of this range but as the catalyst ages, the temperature may be increased in order to maintain the desired degree of activity.

The heavy oil feedstock is passed over the catalysts in the presence of hydrogen. The space velocity of the oil is usually in the range 0.1 to 10 LHSV, preferably 0.2 to 2.0 LHSV and the hydrogen circulation rate from 250 to 1000 n.1.1$^{-1}$ (about 1400 to 5600 SCF/bbl) and more usually from 300 to 800 (about 1685 to 4500 SCF/bbl). Hydrogen partial pressure is usually at least 75 percent of the total system pressure with reactor inlet pressures normally being in the range of 400 to 1500 psig (about 2860 to about 10445 kPa abs), more commonly from 800 to 1200 psig (about 5620 to 8375 kPa abs) for low to moderate pressure operation. High pressure operation at least 1000 psig (about 6996 kPa abs) is also feasible. In the high pressure mode, pressures from about 1500 to 5000 psig (about 10445 to 34575 kPa abs) are typical although higher pressures may also be utilized with the upper limit usually being set by equipment constraints. When operating at low conversions, for example, less than 50 weight percent conversion to 345° C.– (about 650° F.–) products, the pressure may be considerably lower than normal, conventional practices.

In any event, total system pressures of about 700 to 1200 psig (about 4930 to 8375 kPa abs) are satisfactory. Low conversion may be obtained by suitable selection of other reaction parameters, e.g., temperature, space velocity, choice of catalyst, and even lower pressures may be used. Low pressures are desirable from the point of view of equipment design since less massive and consequently cheaper equipment will be adequate. Similarly, lower pressures usually influence less aromatic saturation and thereby permit economy in the total amount of hydrogen consumed in the process.

A preliminary hydrotreating, as mentioned above, may be employed, in which case, the relative proportions of the hydrocracking and the hydrotreating catalysts may be varied according to the feedstock in order to convert the nitrogen in the feedstock to ammonia before the charge passes to the hydrocracking step; the object is to reduce the nitrogen level of the charge to a point where the desired degree of conversion by the hydrocracking catalyst is attained with the optimum combination of space velocity and reaction temperature. The greater the amount of nitrogen in the feed, the greater then will be the proportion of hydrotreating (denitrogenation) catalyst relative to the hydrocracking catalyst. If the amount of nitrogen in the feed is low, the catalyst ratio may be as low as 10:90 (by volume, denitrogenation: hydrocracking). In general, however, ratios between 25:75 to 75:25 will be used. With many stocks an approximately equal volume ratio will be suitable, e.g. 40:60, 50:50 or 60:40.

The overall conversion may be maintained at varying levels depending on the nature of the feed and on the desired product characteristics. It is possible to operate the process at a low conversion level, less than 50 weight percent to lower boiling products, usually 340° C.– (650° F.–) products from the heavy oil feedstocks used while still maintaining satisfactory product quality. The conversion may, of course, be maintained at even lower levels, e.g. 30 or 40 percent by weight. The degree of cracking to gas ($C_4$-) which occurs at these low conversion figures is correspondingly low and so is the conversion to naphtha (200° C.–, 400° F.–); the distillate selectivity of the process is accordingly high and overcracking to lighter and less desired products is minimized. It is believed that in cascade operation this effect is procured, in part, by the effect of the ammonia carried over from the first stage. Control of conversion may be effected by conventional expedients such as control of temperature, pressure, space velocity and other reaction parameters.

Hydrotreating

The feed is preferably passed over a hydrotreating catalyst before the moderate pressure hydrocracking catalyst in order to convert nitrogen and sulfur containing compounds to gaseous ammonia and hydrogen sulfide. At this stage, hydrocracking is minimized but partial hydrogenation of polycyclic aromatics proceeds, together with a limited degree of conversion to lower boiling (345° C.–, 650° F.–) products. The catalyst used in this stage may be a conventional denitrogenation (denitrification) catalyst. Catalysts of this type are relatively immune to poisoning by the nitrogenous and sulfurous impurities in the feedstock and, generally comprise a non-noble metal component supported on an amorphous, porous carrier such as silica, alumina, silica-alumina or silica-magnesia. Because extensive cracking is not desired in this stage of the process, the acidic functionality of the carrier may be relatively low compared to that of the subsequent hydrocracking catalyst. The metal component may be a single metal from Groups VIA and VIIIA of the Periodic Table such as nickel, cobalt, chromium, vanadium, molybdenum, tungsten, or a combination of metals such as nickel-molybdenum, cobalt-nickel-molybdenum, cobalt-molybdenum, nickel-tungsten or nickel-tungsten-titanium. Generally, the metal component will be selected for good hydrogen transfer activity; the catalyst as a whole will have good hydrogen transfer and minimal cracking characteristics. The catalyst should be pre-sulfided in the normal way in order to convert the metal component (usually impregnated into the carrier and converted to oxide) to the corresponding sulfide.

In the hydrotreating (denitrogenation) stage, the nitrogen and sulfur impurities are converted to ammonia and hydrogen sulfide. At the same time, the polycyclic aromatics are partially hydrogenated to form naphthenes and hydroaromatics which are more readily cracked in the lube hydrocracking stage. The effluent from the first stage may be passed directly to the second or hydrocracking stage without the conventional interstage separation of ammonia or hydrogen sulfide. Hydrogen quenching may be carried out in order to control the effluent temperature and to control the catalyst temperature in the second stage. However, interstage separation of ammonia and hydrogen sulfide and light fractions may be carried out, especially with the noble metal hydrocracking catalysts which are more sensitive to the impurities.

Hydrocracking

The effluent from the denitrogenation/desulfurization stage is passed to the hydrocracking step to crack partially hydrogenated aromatics and carry out the other characteristic reactions which take place over the hydrocracking catalyst.

Moderate Pressure Fuels Hydrocracking Catalyst

The moderate pressure hydrocracking catalyst may be a conventional bifunctional catalyst which comprises an amorphous material together with a hydrogenation-dehydrogenation component. The catalyst can be a mesoporous crystalline material, as described below, as a support which provides the desired acidic functionality for the hydrocracking reactions, together with a hydrogenation-dehydrogenation component.

The hydrogenation-dehydrogenation component is provided by a metal or combination of metals. Noble metals of Group VIIIA, especially palladium, platinum, or base metals of Groups IVA, VIA and VIIIA, especially chromium, molybdenum, tungsten, cobalt and nickel, may be used. The combination of at least one Group VIA metal such as tungsten with at least one Group VIIA metal such as nickel is particularly preferred for many applications, for example, combinations such as nickel-molybdenum, cobalt-nickel, nickel-tungsten, cobalt-nickel-molybdenum and nickel-tungsten-titanium. For certain applications palladium or platinum is preferred.

The content of the metal component will vary according to its catalytic activity. Thus, the highly active noble metals may be used in smaller amounts than the less active base metals. For example, about 1 wt. percent or less palladium or platinum will be effective and in a preferred base metal combination, about 7 wt. percent nickel and about 2.1 to about 21 wt. percent tungsten, expressed as metal. The hydrogenation component can be exchanged onto the support material, impregnated into it or physically admixed with it. If the metal is to be impregnated into or exchanged onto the mesoporous support, it may be done, for example, by treating the zeolite with a palladium or platinum metal-containing ion. Suitable platinum compounds include chloroplatinic acid, platinous chloride and various compounds containing the platinum ammine complex. The metal compounds may be either compounds in which the metal is present in the cation of the compound and compounds in which it is present in the anion of the compound. Both types of compounds can be used. Palladium or platinum compounds in which the metal is in the form of a cation of cationic complex, e.g., $Pd(NH_3)_4Cl_2$ or $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

Interstage Separation

Interstage separation may be employed to separate the high boiling bottoms fraction, which is a most appropriate feed for the high pressure lube hydrotreating stage, from the gasoline and distillage fraction. This may be accomplished by passing the fuels hydrocracked effluent through a fractionator, e.g., an atmospheric distillation and/or vacuum distillation tower, to isolate the 600° F.+, more specifically 650° F.+ bottoms fraction.

LUBE HYDROPROCESSING STAGE

The hydrocracked feed is subjected to a subsequent high pressure lube hydroprocessing over a catalyst based on a composition of matter comprising an inorganic non-pillared crystalline phase exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C.

The catalyst is usually a bifunctional catalyst to promote aromatics saturation of the feed to produce lubricant products which are more paraffinic and naphthenic. In a specific embodiment, the catalyst comprises a metal hydrogenation-dehydrogenation component on the mesoporous support which provides the desired acidic functionality.

This stage is carried out under high pressure to favor aromatics saturation but the conversion is maintained at a relatively low level in order to minimize cracking of the aromatic and paraffinic components of the feed and of the products obtained from saturation of the aromatic materials. Consistent with these process objectives, the hydrogen pressure is at least 800 psig (about 5620 kPa abs.) and usually is in the range of 1,000 to 3,000 psig (about 7000 to 20785 kPa abs). Normally, hydrogen partial pressures of at least 1500 psig (about 1435 kPa abs.) are best in order to obtain a high level of aromatic saturation with pressures in the range of 1500 to 2500 psig (about 1435 to 17340 kPa abs) being suitable for most high pressure equipment. Hydrogen circulation rates of at least about 1000 SCF/Bbl (about 180 n.1.1 .), preferably in the range of 5,000 to 10,000 SCF/Bbl (about 900 to 1800 n.1.1$^{-1}$) are suitable. Total system pressures of at least 400, typically in the range of 1500 to 3000. Normally, total system pressures are between 2000 and 2500 to obtain the desired results. Higher system pressures may be employed where cracking of the aromatics is desired.

In this stage of the process, maintaining the boiling range of the feed to avoid production of products boiling below the lube boiling range, typically to 650° F.– (about 345° C.–) products is advantageous. The actual conversion is dependent on the quality of the feed, however. The feed from the fuels hydrocracker usually contains from about 25 to 55 wt. % paraffins, specifically from about 35 to 45 wt. %, from about 10 to 25 wt. % mononaphthenes, specifically from 15 to 20 wt. %, from about 10 to 40 wt. % polynaphthenes, specifically from about 15 to 30 wt. %, from at least about 10 wt. % aromatics ranging from about 10 to 30 wt. % aromatics, specifically from about 15 to 20 wt. %, and from about 1 to 10 wt. % polynuclear aromatics, specifically from about 2 to 4 wt. %. In a typical hydrotreating process, the boiling range conversion should be less than about 5%. If a degree of hydrocracking is preferred, the conversion should typically range from 5% to 25%.

Thus, the exact temperature selected to achieve the desired reactions depend on the characteristics of the feed as well as upon the extent to which it is necessary to remove the low quality aromatic components from the feed. The conditions in the lube high pressure hydroprocessing stage are adjusted to minimize conversion to non-lube boiling range products (usually about 650° F.–(345° C.–) materials). Since the catalyst used in this stage is of low acidity, conversion to lower boiling products is usually at a relatively low level and by appropriate selection of severity, this stage of operation may be optimized for isomerization over cracking. At conventional space velocities of about 1, using a noble metal-containing mesoporous catalyst, temperatures in this stage will typically be in the range of about 500° to about 700° F. (about 245° to 370° C.), usually not more than 685° F. (363° C.), specifically about 650° F. However, temperatures may be used outside this range, for example, below about 350° F. (176° C.) up to about 750° F. (about 400° C.) although the higher temperatures will usually not be preferred since they will be associated with a lower isomerization selectivity and the production of less stable lube products as a result of the hydrogenation reactions being thermodynamically less favored at progressively higher operating temperatures. With the increased activity resulting from the use of high hydrogen pressures temperatures from about 550° to 700° F. (about 290° to 370° C.) will be preferred. Space velocities will typically be in the range of 0.25 to 2 LHSV (hr.$^{-1}$) usually in the range of 0.5 to 1.5 LHSV (hr.$^{-1}$) although in most cases a space velocity of about 1 LHSV will be most favorable. In order to achieve the desired severity in this stage, temperature may also be correlated with the space velocity. Hydrogen circulation rates are comparable to those used in the first step, as described above but since there is no significant hydrogen consumption as a result of near hydrogen balance in this stage of the process, lower circulation rates may be employed if feasible.

As mentioned previously, this stage is carried out with a bifunctional lube hydrotreating catalyst which is based on a mesoporous crystalline support material, described in more detail below. Noble metals such as platinum or palladium may be used since they have good hydrogenation activity in the absence of sulfur. Since the feeds are, typically, hydrotreated prior to the fuels hydrocracking step and they will normally not contain high levels of sulfur, noble metals are preferred. The amounts of the metals present on the catalyst are chosen to achieve good hydrogenation activity and it generally will be at least 0.1 wt. % and will range from about 0.1 to 40 weight percent of the noble metal. More specifically 0.3 to 25 wt. %. If a Group VIIIA and/or a Group IVA metal is used, relatively higher amounts are in order in view of the lower hydrogenation activities of these metals, typically from about 0.3 to 5 weight percent being sufficient. The metals may be incorporated by any suitable method including impregnation onto the porous support after it is formed into particles of the desired size or by addition to a gel of the support materials prior to calcination. Addition to the gel is a technique which may be used for the preparation of the amorphous type catalysts when relatively high amounts of the metal components are to be added e.g. above 10 weight percent of the Group VIIIA metal and above 20 weight percent of the Group VIA metal, although subsequent processing steps including calcination may adversely affect the uniformity of the distribution of the metal.

Although acceptable results are demonstrated over an unpromoted catalyst, if necessary in order to obtain the desired conversion, the catalyst may be promoted with fluorine, either by incorporating fluorine into the catalyst during its preparation or by operating the hydrocracking in the presence of a fluorine compound which is added to the feed. Fluorine compounds may be incorporated into the catalyst by impregnation during its preparation with a suitable fluorine compound such as ammonium fluoride ($NH_4F$) or ammonium bifluoride ($NH_4F.HF$) of which the latter is preferred. The amount of fluorine used in catalysts which contain this element is preferably from about 1 to 10 weight percent, based on the total weight of the catalyst, usually from about 2 to 6 weight percent. The fluorine may be incorporated by adding the fluorine compound to a gel of the metal oxide support during the preparation of the catalyst or by impregnation after the particles of the catalyst have been formed by drying or calcining the gel. If the catalyst contains a relatively high amount of fluorine as well as high amounts of the metals, as noted above, it is preferred to incorporate the metals and the fluorine compound into the metal oxide gel prior to drying and calcining the gel to form the finished catalyst particles.

The catalyst activity may also be maintained at the desired level by in situ fluoriding in which a fluorine compound is added to the stream which passes over the catalyst in this stage of the operation. The fluorine compound may be added continuously or intermittently to the feed or, alternatively, an initial activation step may be carried out in which the fluorine compound is passed over the catalyst in the absence of the feed e.g. in a stream of hydrogen in order to increase the fluorine content of the catalyst prior to initiation of the actual hydrocracking. In situ fluoriding of the catalyst in this way is preferably carried out to induce a fluorine content of about 1 to 10 percent fluorine prior to operation, after which the fluorine can be reduced to maintenance levels sufficient to maintain the desired activity. Suitable compounds for in situ fluoriding are orthofluorotoluene and difluoroethane.

The advantage of the mesoporous crystalline materials in these catalysts is that the catalysts are capable of having high levels of metal while still retaining high surface areas: these catalysts are very effective for the processing of feeds such as those used in the present process where the objective is to achieve a high degree of saturation. Co-pending application Ser. No. 07/928,549 filed on Aug. 13, 1992 describes high metal content catalysts based on the crystalline mesoporous support materials and reference is made to Ser. No. 07/928,549 for details of such catalysts and their preparation and use.

Typically, the lube hydrotreating catalysts using the mesoporous materials (as described below) as supports will have base metal contents above 12.9 weight percent (based on the entire catalyst) for good hydrogenation activity while retaining surface areas of at least 200 $m^2.g^{-1}$ Lube hydrotreating catalyst containing noble metals will have contents typically at 1 wt. % or below. Higher metal loadings are possible, while still retaining sufficient catalytic surface area to enable the use of promoters to be dispensed with. Thus, for example, catalysts with base metal loadings of about 25 percent and above still maintain a high surface area above 200 $m^2$ $g^{-1}$ and the total metal content (i.e of the metal component) may exceed about 30 weight percent, e.g. 30–40 weight percent, of the entire catalyst while still retaining a surface area of at least 200 $m^2$ $g^{-1}$ e.g. 240 $m^2g^{-1}$ or even higher. At lower metal contents, the surface area will be correspondingly higher so that, for example, at a total metal content of about 20 weight percent of the entire catalyst, the surface area will be at least 400 g or higher, larger by a factor of about three or more compared to conventional amorphous catalysts with similar metal loadings. At about 12 to 15 percent total metal, e.g. 13 percent, the surface area will be at least 500 $m^2g^{-1}$. Catalysts containing at least about 25 weight percent total metal with a retained surface area of at least 300 g constitute a highly useful class of hydrocracking catalysts.

Another advantage accruing from the use of the mesoporous supports is that in spite of the high metal loadings which may be accommodated, the density of the catalyst remains relatively low, compared to conventional catalysts. At a total metal content of about 12 to 15 weight percent, for example, e.g. at levels exceeding the normal minimum loading of 12.9 percent, the real density of the catalyst is about 2.8 $g.cc^{-1}$, as compared to conventional catalysts which have real densities of at least about 4 at these loadings. At higher loadings, a similar advantage prevails: the present catalysts are only about three-fourths as dense as conventional catalysts at comparable metal loadings. For example, at metal loadings of about 20 to 25 weight percent of the entire catalyst, the real density will be in the range of 3.000 to 3.300 $g.cc^{-1}$, as compared to about 4.00 to 4.2 for conventional catalysts. At metal loadings above about 30 weight percent, the real density will be in the range of about 4.1 to 4.3 $g.cc^{-1}$. Particle densities range from about 0.88 at about 12 to 15 weight percent metal to about 1.0 at about 20 to 25 weight percent metal and about 1.1 at 30 to 40 weight percent metal. Real densities are determined by measuring the volume of mercury displaced by a given weight of catalyst.

The pore volumes of the catalysts based on the mesoporous supports are commensurately high: a pore volume of at least 0.55 $cc.g^{-1}$ and usually higher, typically at least about 0.6 $cc.g^{-1}$ at metal loadings as high as 20 weight percent is typical. Pore volumes are determined by subtracting the inverse of the real density from the inverse of the particle density.

The hydrogenation component can be exchanged onto the mesoporous support material, impregnated into it or physically admixed with it, or any combination of these methods. If the metal is to be impregnated into or exchanged onto the mesoporous support, it may be done, for example, by treating the calcined material with a metal-containing cation. A preferred exchange technique involves competitive exchange in the presence of ammonium cations (which are converted into hydrogen on subsequent calcination); it is thought that this technique may disperse the metal cations more evenly throughout the pore structure of the support material. Metals which form stable anions are suitable for incorporation by impregnation; typical anionic complexes such as the molybdate, vanadate and metatungstate ions may be used to incorporate molybdenum, vanadium and tungsten. Other metals may be incorporated using suitable anionic complexes in the same way. Cationic forms of metals exchanged onto the crystalline material or impregnated into it. A particular advantage of the present catalysts is that the high loadings of two or more metals may be incorporated by a single impregnation onto the calcined material using the incipient wetness technique rather than successive impregnations with the different metals; this produces a more uniform distribution of the two or more metals in the catalyst. It is an additional advantage that the high metals levels, above about 25 weight percent total metal may be incorporated by impregnation into the calcined material as distinct from the conventional techniques requiring incorporation of a solution of the metal components(s) into a hydrogel prior to calcination. The fact that the present catalysts have good bifunctional activity without the necessity for halogen promoter also enables the halogen promoter to be dispensed with.

The metals present on the hydrocracking catalyst can be used in their sulfide form and to this purpose pre-sulfiding of the catalyst can be carried out prior to initiation of the hydrocracking. Sulfiding is an established technique and it is typically carried out by contacting the catalyst with a sulfur-containing gas, usually in the presence of hydrogen. The mixture of hydrogen and hydrogen sulfide, carbon disulfide or a mercaptan such as butyl mercaptan is conventional for this purpose. Presulfiding may also be carried out by contacting the catalyst with hydrogen and a sulfur-containing hydrocarbon oil such as a sour kerosene or gas oil.

Dewaxing

A dewaxing step will normally be necessary in order to achieve the desired product pour point. Either catalytic dewaxing or solvent dewaxing may be used and if a solvent dewaxer is used, the removed wax may be recycled to either the fuels hydrocracking stage or the lube hydrotreating stage.

Catalytic dewaxing processes are often preferred. Catalytic dewaxing processes contemplated utilize a crystalline inorganic oxide material, typically, a silicate which includes an inorganic oxide. Usually, the process utilizes an intermediate pore size zeolite such as a ZSM-5 zeolite which may include a hydrogenation-dehydrogenation component. U.S. Pat. No. Re. 28,398 describes a process for catalytic dewaxing with a catalyst comprising ZSM-5. U.S. Pat. Re. 28,398 is incorporated herein by reference in its entirety. Dewaxing catalysts are, typically, based on the highly constrained intermediate pore size zeolites such as ZSM-22, ZSM-23 or ZSM-35. These zeolites have been found to provide highly selective dewaxing, giving dewaxed products of low pour point and high VI. Dewaxing processes using these zeolites are described in U.S. Pat. No. 4,222,855. The naturally occurring zeolite ferrierite may also be employed.

These zeolites are at least partly in the acid or hydrogen form when they are used in the dewaxing process and a metal hydrogenation component, preferably a noble metal such as platinum is preferable used. Excellent results have been obtained with a Pt/ZSM-23 dewaxing catalyst.

The preparation and properties of zeolites ZSM-22, ZSM-23 and ZSM-35 are described respectively in U.S. Pat. Nos. 4,810,357 (ZSM-22); 4,076,842 and 4,104,151 (ZSM-23) and 4,016,245 (ZSM-35), to which reference is made for a description of this zeolite and its preparation. Ferrierite is a naturally-occurring mineral, described in the literature, see, e.g., D. W. Breck, ZEOLITE MOLECULAR SIEVES, John Wiley and Sons (1974), pages 125–127, 146, 219 and 625, to which reference is made for a description of this zeolite.

Dewaxing conditions of temperature are maintained to achieve a target pour point of about 20° F., preferably within the range of about 500° F. to 675° F., and this is usually achieved, depending upon the paraffinic character of the feed, at temperatures within the range of about 400° F. to 800° F. (204° C. to 407° C.), specifically from about 500° F. to 675° F. (260° C. to 357° C.), without a loss of more than about 50 wt. %, usually about 5 to 40 wt. %. Although high pressure conditions are not necessary for dewaxing, the pressures can be relatively high, e.g. at least about 400 psig, usually within the range of 400–3000 psig, total system pressure. Space velocities will typically be in the range of about 0.25 to 2 LHSV (hr.$^{-1}$), usually within the range of 0.5 to 1.5 LHSV (hr. $^{-1}$), a space velocity of 1 LHSV (hr. $^{-1}$) being suitable.

Dewaxing can be performed at any stage in the process, however, usually the fuels hydrocracker Dottoms fraction is dewaxed prior to lube hydrocracking.

The dewaxing-hydrocracking may be conducted in cascade operational mode with the effluent from the dewaxing process passed directly to the lube hydrocracking process.

Mesoporous Crystalline Catalyst

The lube hydroprocessing catalyst and, optionally, the fuels hydrocracking catalyst, is a mesoporous crystalline material which is described in greater detail below. The mesoporus crystalline material is, typically, at least partly in the decationized or hydrogen form in order to provide the desired low degree of acidic functionality for the reactions which are to take place in this stage of the operation.

The catalytic material used in the present invention includes a novel synthetic composition of matter an inorganic, non-pillared crystalline material which has the following composition:

$$M_{n/q}(W_a X_b Y_c Z_d O_h)$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d) =1.

A preferred embodiment of the above crystalline material is when (a+b+c) is greater than d, and h=2. A further embodiment is when a and d=0, and h=2. In the as-synthesized form, the material of this invention has a composition, on an anhydrous basis, expressed empirically as follows:

$$rM_{n/q}(W_a X_b Y_c Z_d O_h)$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described.

To the extent desired, the original M, e.g. sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Groups IA (e.g. K), IIA (e.g. Ca), VIIA (e.g. Mn), VIIIA (e.g. Ni),IB (e.g. Cu), IIB (e.g. Zn), IIIB (e.g. In), IVB (e.g. Sn), and VIIB (e.g. F) of the Periodic Table of the Elements (Sargent-Welch Scientific Co. Cat. No. 5-18806, 1979) and mixtures thereof.

The crystalline (i.e. having an X-ray diffraction pattern with at least one peak) material of this invention may be characterized by its structure, including extremely large pore windows, and high sorption capacity.

In its calcined form, the crystalline material may be characterized by an X-ray diffraction pattern with at least one peak at a position greater than about 18 Angstrom Units d-spacing (4.909 degrees two-theta for Cu K-alpha radiation) and an equilibrium benzene adsorption capacity of greater than about 15 grams benzene/100 grams crystal at 50 torr and 25° C. (basis: anhydrous crystal material having been treated to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined crystalline material may be characterized by an X-ray diffraction pattern with at least two peaks at positions greater than about 10 Angstrom Units d-spacing (8.842 degress two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak.

Still more particularly, the calcined inorganic, non-pillared crystalline material is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks.

The diffraction data were recorded by step-scanning at 0.04 degrees of two-theta, where theta is the Bragg angle, and a counting time of 10 seconds for each step. The interplanar relative intensities of the lines, $I/I_o$, where $I_o$ is spacings, d's, were calculated in Angstrom units (A), and the one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the anydrous material of the invention, after oxidative calcination at 450°–700° C. for at least one hour and other treatment, if necessary, to remove any pore blocking contaminants, at 25° C. and 50 torr benzene until equilibrium is reached. The weight of benzene sorbed is then determined as more particularly described hereinafter.

When used as a sorbent or catalyst component, the composition of the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be peformed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience, such as in air, nitrogen, ammonia, etc. The thermal treatment can be performed at a temperature up to about 925° C. The thermally treated product is particularly useful in the catalysis of certain hydrocarbon conversion reactions.

The crystalline material of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The present crystalline material can be prepared from a reaction mixture containing sources of, for example, alkali or alkaline earth metal (M), e.g. sodium or potassium, cation, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, especially water, said reaction mixture having a composition, in terms of mole ratios of oxides, within the following ranges:

| Reactants | Useful | Preferred |
| --- | --- | --- |
| $X_2O_3/YO_2$ | 0 to 0.05 | 0.001 to 0.05 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$YO_2$ | 1 to 1500 | 5 to 1000 |
| $OH^-/YO_2$ | 0.01 to 10 | 0.05 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0.005 to 5 | wherein e and f are the weighted average valences of M and R, respectively.

In the present synthesis method, when no Z and/or W oxides are added to the reaction mixture, the pH is critical and must be maintained at from about 10 to about 14. When Z and/or W oxides are present in the reaction mixture, the pH is not narrowly critical and may vary between about 1 and 14 for crystallization of the present invention.

Crystallization of the present crystalline material can be carried out under either static or agitated, e.g. stirred, conditions in a suitable reactor vessel, such as for example, polypropylene jars or teflon lined or stainless steel autoclaves. The total useful range of temperatures for crystallization is from about 50° C. to about 250° C. for a time sufficient for crystallization to occur at the temperature used, e.g. from about 5 minutes to about 14 days. Thereafter, the crystals are separated from the liquid and recovered.

By adjusting conditions of the synthesis reaction, like temperature, pH and time of reaction, etc., within the above limits, embodiments of the present non-pillared crystalline material with a desired average pore size, may be prepared. In particular, lowering the pH, increasing the temperature or increasing reaction time may promote formation of product crystals with greater average pore size.

Non-limiting examples of various combinations of W, X, Y and Z contemplated for the present invention include:

| W | X | Y | Z |
| --- | --- | --- | --- |
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in synthesizing the present material from the above reaction mixture is a quaternary ammonium or phosphonium ion of the formula:

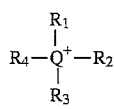

wherein Q is nitrogen or phosphorus and wherein at least one of $R_1$, $R_2$, $R_3$ and $R_4$ is aryl or alkyl of from 6 to about 36 carbon atoms, e.g. $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from the group consisting of hydrogen, alkyl of from 1 to 5 carbon atoms and combinations thereof. The compound from which the above quaternary ammonium or phosphonium ion is derived may be, for example, the hydroxide, halide, or silicate.

It is preferred in the present synthesis that an additional organic be present in the reaction mixture along with the above quaternary ammonium or phosphonium. That additional organic is the quaternary ammonium or phosphonium ion of the above directing agent formula wherein $R_1$, $R_2$, $R_3$ and $R_4$ are selected from the group consisting of hydrogen and alkyl of 1 to 5 carbon atoms and combinations thereof.

The particular effectiveness of the presently required directing agent, when compared With other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylammonium, octadecyltrimethylphosphonium, benzyltrimethylammonium, cetylpyridinium, decyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The present compositions are useful as catalyst components for catalyzing the conversion of organic compounds, e.g. oxygenates and hydrocarbons, by acid-catalyzed reactions. The size of the pores is also such that the spatiospecific selectivity with respect to transition state species is minimized in reactions such as cracking (Chen et al., "Shape Selective Catalysis in Industrial Applications" 36 CHEMICAL INDUSTRIES, pgs. 41–61 (1989) to which reference is made for a discussion of the factors affecting shape selectivity). Diffusional limitations are also minimized as a result of the very large pores in the present materials. For these reasons, the present compositions are especially useful for catalyzing reactions which occur in the presence of acidic sites on the surface of the catalyst and which involve reactants, products or transitional state species which have large molecular sizes, too great for undergoing similar reactions with conventional large pore size solid catalysts, for example, large pore size zeolites such as zeolite X, Y, L, ZSM-4, ZSM-18, and ZSM-20.

Thus, the present catalytic compositions will catalyze reactions such as cracking, and hydrocracking, and other conversion reactions using hydrocarbon feeds of varying molecular sizes, but with particular applicability to feeds with large molecular sizes such as highly aromatic hydrocarbons with substituted or unsubstituted polycyclic aromatic components, bulky naphthenic compounds or highly substituted compounds with bulky steric configurations, e.g. molecular sizes of about 13 Angstroms or more.

As in the case of many catalysts, it may be desired to incorporate the new crystal composition with another material resistant to the temperatures and other conditions employed in organic conversion processes. Such materials include active and inactive materials and synthetic or naturally occuring zeolites as well as inorganic materials, such as clays, silica and/or metal oxides such as alumina, titania and/or zirconia. The latter may be either naturally occurring or in the form of gelatinous precipitates or gels including mixtures of silica and metal oxides. Use of a material in conjunction with the new crystal, i.e. combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated with naturally occurring clays, e.g. bentonite and kaolin, to improve the crush strength of the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. These clay binders have been employed normally only for the purpose of improving the crush strength of the catalyst.

Naturally occurring clays which can be composited with the crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite.

In addition to the foregoing materials, the crystal can be composited with a porous matrix material such as silica-alumina, silica-magnesia, silica-zirconia, silica-thoria, silica-beryllia, silica-titania as well as ternary compositions, such as silica-alumina-boria, silica-alumina-zirconia, silica-alumina-magnesia, and silica-magnesia-zirconia.

The reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the synthesis procedure can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The size of the pores in the present mesoporous catalytic materials is large enough that the spatiospecific selectivity with respect to transition state species in reactions such as cracking is minimized (Chen et al., "Shape Selective Catalysis in Industrial Applications" 36 CHEMICAL INDUSTRIES, pgs. 41–61 (1989) to which reference is made for a discussion of the factors affecting shape selectivity). Diffusional limitations are also minimized as a result of the very large pores. The crystals of the mesoporous support material will be composited with a matrix material to form the finished catalyst and for this purpose conventional non-acidic matrix materials such as alumina, silica-alumina and silica are suitable. The mesoporous material is usually composited with the matrix in amounts from 80:20 to 20:86 by weight, typically from 80:20 to 50:50 mesoporous material:matrix. Compositing may be done by conventional means including mulling the materials together followed by extrusion of pelletizing into the desired finished catalyst particles. A preferred method for extrusion with silica as a binder is disclosed in U.S. Pat. No. 4,582,815. If the catalyst is to be steamed in order to achieve the desired low acidity, it is performed after the catalyst has been formulated with the binder, as is conventional.

The catalyst may be treated by conventional pre-sulfiding treatments, e.g. by heating in the presence of hydrogen sulfide, to convert oxide forms of the metal components to their corresponding sulfides.

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPOnt TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm.

Products

The VI viscosity index values are in the range of 90 to 130, with product yields of 70–80 wt. %, usually at least 75 wt. %. The product viscometrics correspond to oils, varying in viscosity, but typically of from about 100 to 700 SUS, at 100° F.

Process Scheme

A suitable process scheme is shown in FIG. 1 in which the feed, typically a gas oil is passed to moderate pressure fuels hydrocracker 10 and processed in a single pass, low to moderate severity hydrocracking operation under low to moderate hydrogen pressures as described above with conversion of about 30 to 70%. The effluent is passed to fractionator 12. The gasoline and distillate may then be separated. The bottoms fraction is passed to the lube hydrocracking stage 18 via an initial dewaxing step 16. The dewaxing step is, typically, a catalytic dewaxing such as over ZSM-5 to produce a hydrocarbon fraction of reduced pour point, i.e. 20° F. The dewaxed fraction is then passed to high pressure lube hydrotreater 18 to be processed over the catalyst described ultra large pore crystalline material to produce a reduced aromatics lube basestock.

In the examples, percentages are by weight unless otherwise indicated.

The following examples illustrate the high pressure lube hydrotreating of a moderate pressure hydrocracked bottoms fraction utilizing an ultra-large pore size catalyst. In these examples a catalyst was prepared as described in U.S. Pat. No. 5,102,643.

EXAMPLE 1

Palladium-Containing Catalyst Preparation

A palladium-containing catalyst was prepared as described below. A sample of a calcined M41S composition (40 Å) was exchanged with room temperature aqueous solutions of ammonium nitrate and was subsequently dried overnight at 250° F. A portion of the resultant crystals was combined with $Al_2O_3$ to form a mixture of 65 parts by weight M41S and 35 parts alumina. Water was added to this mixture to allow the resulting catalyst to be formed into extrudates. The catalyst was activated by calcination at 900° F. in 5 v/v/min nitrogen for 6 hours followed by the replacement of the nitrogen flow with 5 v/v/min of air. The calcination was completed by raising the temperature to 1000° F. and maintaining that temperature for 12 hours. Palladium was incorporated by impregnation with an aqueous solution of a palladium tetraamine salt, $Pd(NH_3)_4Cl_2$. The extrudate was then dried at 250° F. overnight and calcined at 570° F. in air for 3 hours. The physical and chemical properties of the Pd/M41S catalyst are provided in Table I below:

TABLE I

| Pd/M41S Catalyst Properties | |
|---|---|
| Palladium, wt. pct. | 0.81 |
| Surface Area, m²/g | 654 |
| Particle Density, g/cc | 0.75 |
| Real Density, g/cc | 2.38 |
| Pore Volume, cc/g | 0.92 |

EXAMPLE 2

A medium pressure hydrocracked bottoms fraction was subjected to catalytic dewaxing and hydroprocessing. The feed was processed in cascade operation over fixed bed reactors. Eighty grams of HZSM-5 dewaxing catalyst was loaded into a first reactor and 240 grams of the Pd/M41S catalyst as described in Example 1 was loaded into the second reactor. Unless otherwise noted, the feed was passed over both catalysts at 2500 psig, 1.0 LHSV over the dewaxing catalyst, 0.33 LHSV over the hydroprocessing catalyst. The temperature in the first reactor was maintained at 585°–610° F. to give a target pour point of 20° F.

Dewaxing was conducted over a medium pore zeolite dewaxing catalyst. The properties of the bottoms fraction are described below in Table II.

TABLE II

| Heaviest 10% of Bottoms Properties at 45 wt. % 710° F+ Conversion | |
|---|---|
| Nitrogen, ppm | 9 |
| Mol. Weight | 558 |
| Pour Point, °F. | >120 |
| KV @ 100° C., cS | 11.3 |
| Composition, wt % | |
| Paraffins | 42.1 |
| Mononaphthenes | 19.9 |
| Polynaphthenes | 21.2 |
| Aromatics | 16.8 |
| Simulated Dist., Wt % | |
| IBP/5 | 209/854 |
| 10/50 | 902/982 |

The hydrotreating was conducted over the Pd/M41S catalyst, as described above and, for comparative purposes, over amorphous catalysts at 525° F. The results of the runs are summarized in the following Table III. The results are presented in terms of the UV absorbance of the product which was used to determine the aromatics in the lubricant base stock. The absorbance at 226 nm is a measure of the total aromatics while the absorbance at 400 nm ($\times 10^3$) is a measure of the polynuclear aromatics.

TABLE III

| Lube Hydrotreating at 525° F. | | | |
|---|---|---|---|
| Run | 1 | 2 | 3 |
| Metal | Pt | Pt | Pd |
| Support | $Al_2O_3$ | $SiO_2/Al_2O_3$ | M41S/$Al_2O_3$ |
| Total Aromatics, 226 nm | 4.63 | 3.81 | 0.200 |
| Polynuclear Aromatics, 400 nm (× 10³) | 40.40 | 19.70 | 1.28 |

Comparing the performance of the amorphous catalysts with the Pd/M41S catalyst it is apparent that M41S is much more effective in saturating aromatics.

EXAMPLE 3

In this example, the same procedure as described in Example 2 was followed with the exception that the hydrotreating temperature was raised to 625° F. and only amorphous catalysts were used to determine whether at higher temperatures, the amorphous catalysts would meet the performance of Pd/M41S. The results of the runs are summarized in the following Table IV.

TABLE IV

| Lube Hydrotreating at 625° F. | | | |
|---|---|---|---|
| Run | 4 | 5 | 6 |
| Metal | NiW | Pt | Pd |
| Support | $Al_2O_3$ | $Al_2O_3$ | $SiO_2/Al_2O_3$ |
| Total Aromatics, 226 nm | 3.24 | 2.75 | 2.95 |
| Polynuclear Aromatics, 400 nm (× 10³) | 73.30 | 6.50 | 8.39 |

As shown in the above Table IV, increasing the temperature did not achieve satisfactory aromatics saturation as compared with the performance of M41S at the lower temperature.

EXAMPLE 4

In this example, the same procedure as described in Example 3 was followed with the exception that the temperature of the lube hydrotreating reactor containing the Pd/M41S catalyst was varied to determine the performance of Pd/M41S in reducing the aromatics content of the feed. The results are summarized in the following Table V.

TABLE V

Lube Hydrotreating over Pd/M41S

| Run | 7 | 8 | 9 |
|---|---|---|---|
| Hydrotreater Temperature °F. | 525 | 500 | 475 |
| Total Aromatics, 226 nm | 0.200 | 0.563 | 1.75 |
| Polynuclear Aromatics, 400 nm (× 10³) | 1.28 | 1.69 | 1.69 |

It is apparent from the results of the above table that, by varying the reactor temperature, the Pd/M41S catalyst offers flexibility in the product aromatics content.

The products of these examples were found to have the following properties: pour point 0°–20° F., kinematic viscosity 9.5 to 12.5 cSt. at 100° C., 400 to 500 SUS, viscosity index 105–110, and lubricant yield 70%–80%.

We claim:

1. A process for producing a lubricant from a hydrocracked distillate boiling range product containing at least 10 wt. % aromatics comprising hydroprocessing the feed over a catalyst comprising a composition of matter comprising an inorganic non-pillared crystalline phase exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C. in the presence of hydrogen and conditions sufficient to convert said hydrocracked distillate boiling range product to a lubricant of reduced aromatics.

2. A process according to claim 1 in which the initial boiling point of the hydrocracked distillate boiling range product is at least about 650° F.

3. A process according to claim 1 in which the catalyst comprises a hydrogenation functionality which is a metal component.

4. A process according to claim 3 in which the metal component is at least one noble metal of Group VIIIA of the Periodic Table.

5. A process according to claim 1 in which the feed is hydrocracked at a hydrogen pressure of at least 800 psig.

6. A process according to claim 1 in which the catalyst further comprises an alumina support.

7. A process according to claim 4 in which the catalyst comprises from 0.1 to 10 weight percent palladium.

8. A process according to claim 1 in which the feed is hydrocracked at a hydrogen partial pressure of at least 1500 psig.

9. A process according to claim 1 in which the feed is hydrotreated at a temperature of at least about 350° F.

10. A process according to claim 1 which further comprises dewaxing the lubricant of reduced aromatics.

11. A process according to claim 10 in which the dewaxing step comprises solvent dewaxing.

12. A process according to claim 10 in which the dewaxing step employs a crystalline inorganic oxide dewaxing component.

13. A process according to claim 12 in which the crystalline inorganic oxide contains a noble metal of Group VIIIA of the Periodic Table of the Elements.

14. A process for producing a lube basestock from a hydrocracked distillate boiling range product containing at least 10% aromatics, comprising the steps of:

(a) separating a fraction boiling above about 600° F. from the hydrocracked distillate boiling range product;

(b) dewaxing the 600° F. product to produce a substantially dewaxed product; and (c) contacting the substantially dewaxed product over a catalyst comprising a composition of matter comprising an inorganic non-pillared crystalline phase exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C. in the presence of hydrogen and conditions sufficient to convert the substantially dewaxed product to a less aromatic lube basestock.

15. A process according to claim 14 in which the catalyst of step (c) further comprises a metal component.

16. A process according to claim 15 in which the metal component comprises at least one metal of Group VIIIA of the Periodic Table.

17. A process according to claim 16 in which the metal component is palladium.

18. A process according to claim 14 in which the dewaxing step comprises catalytic dewaxing over a catalyst comprising a crystalline inorganic oxide.

19. A process according to claim 18 in which the crystalline inorganic oxide is ZSM-5, ZSM-22, ZSM-23 or ZSM-35.

20. A process according to claim 18 in which the crystalline inorganic oxide is an aluminosilicate.

21. A process according to claim 20 in which the crystalline inorganic oxide contains a noble metal of Group VIIIA of the Periodic Table of the Elements.

22. A process according to claim 14 in which the substantially dewaxed product is contacted over the catalyst at a hydrogen partial pressure of 1500 to 2500 psig.

23. A process for producing a lubricant having a reduced aromatics content from a gas oil feedstock, which comprises:

(i) hydrocracking the gas oil feedstock under low to moderate pressure conditions of 400 to 1500 psig over hydrocracking catalyst having acidic functionality and hydrogenation-dehydrogenation functionality under conditions sufficient to form a distillate product and a bottoms fraction boiling above the range of the distillate product which is rich in aromatics;

(ii) separating the distillate product from the bottoms fraction;

(iii) dewaxing the bottoms fraction to achieve a target pour point; and (iv) hydroprocessing the dewaxed bottoms fraction over a catalyst comprising a composition of matter comprising an inorganic, non-pillared crystalline phase exhibiting, after calcination, an X-ray diffraction pattern with at least one peak at a position greater than about 18 Angstrom Units d-spacing with a relative intensity of 100, and a benzene adsorption capacity of greater than about 15 grams benzene per 100 grams anhydrous crystal at 50 torr and 25° C. and a hydrogenation, dehydrogenation functionality in the presence of hydrogen and under conditions sufficient to reduce the aromatics content of the fraction.

24. A process according to claim 23 in which the dewaxed bottoms fraction is subjected to hydroprocessing conditions comprising temperatures ranging from about 350° F. to 700° F. and LHSV of 0.25 to 2.

25. The process according to claim 22 in which the hydrogen partial pressure of the hydroprocessing of step (iv) is at least about 1500 psig.

26. The process according to claim 22 in which the hydroprocessing catalyst of step (iv) comprises a noble metal hydrogenation-dehydrogenation component.

* * * * *